United States Patent
Ogawa (10) Patent No.: US 10,754,235 B2
(45) Date of Patent: Aug. 25, 2020

(54) LIGHT SOURCE DEVICE AND PROJECTOR

(71) Applicant: CASIO COMPUTER CO., LTD., Shibuya-ku, Tokyo (JP)

(72) Inventor: Masahiro Ogawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/359,775

(22) Filed: Mar. 20, 2019

(65) Prior Publication Data
US 2019/0294034 A1 Sep. 26, 2019

(30) Foreign Application Priority Data
Mar. 26, 2018 (JP) .................. 2018-058326

(51) Int. Cl.
*G03B 21/20* (2006.01)
*H04N 9/31* (2006.01)
*G03B 21/28* (2006.01)
*G03B 33/12* (2006.01)
*G03B 21/16* (2006.01)

(52) U.S. Cl.
CPC ....... *G03B 21/204* (2013.01); *G03B 21/2073* (2013.01); *G03B 21/28* (2013.01); *G03B 33/12* (2013.01); *H04N 9/3161* (2013.01); *G03B 21/16* (2013.01)

(58) Field of Classification Search
CPC ............. G03B 21/204; G03B 21/2073; H04N 9/3161; H04N 9/3158
See application file for complete search history.

(56) References Cited

U.S. PATENT DOCUMENTS

| 2011/0199580 | A1* | 8/2011 | Hirata | G03B 21/20 353/31 |
| 2012/0242912 | A1 | 9/2012 | Kitano | |
| 2014/0354892 | A1 | 12/2014 | Kitano | |
| 2017/0059975 | A1* | 3/2017 | Aizaki | G03B 33/12 |
| 2017/0205692 | A1* | 7/2017 | Aoki | G03B 21/16 |

FOREIGN PATENT DOCUMENTS

JP 2012212129 A 11/2012

* cited by examiner

*Primary Examiner* — Ryan D Howard
(74) *Attorney, Agent, or Firm* — Holtz, Holtz & Volek PC (57) ABSTRACT

A light source device includes a light emitting element emitting light of a first wavelength band, a fluorescent wheel and a mirror. The fluorescent wheel includes a fluorescent area converting the light of the first wavelength band into fluorescent light and a reflection area reflecting the light of the first wavelength band. The minor reflects a component in a first polarization direction of the light of the first wavelength band and transmits a component in a second polarization direction orthogonal to the first polarization direction. The reflection area includes a reflecting surface and a polarization conversion layer including an optical axis and converts either the first or second polarization direction to another polarization direction. The optical axis of the polarization conversion layer is inclined by 45 degrees to a polarization direction of the light of the first wavelength band at an irradiation position thereof in the fluorescent wheel.

14 Claims, 9 Drawing Sheets

LIGHT SOURCE DEVICE AND PROJECTOR

CROSS-REFERENCE TO RELATED APPLICATION

This application is based on and claims priority under 35 USC 119 from Japanese Patent Application No. 2018-058326, filed on Mar. 26, 2018, the contents of which are incorporated herein by reference.

FIELD OF THE INVENTION

The present invention relates to a light source device and a projector including the light source device.

DESCRIPTION OF THE RELATED ART

Recently, projectors are often used as imaging apparatuses for projecting screens of personal computers, video screens, images stored in memory cards and the like, and so on onto screens. Such projectors concentrates light emitted from light sources on a display element called Digital Micromirror Device (DMD) or a liquid crystal panel, and display color images on a screen.

For example, JP-A-2012-212129 discloses a light source device which includes an excitation light source, a wheel provided with a phosphor layer, a dichroic mirror provided between the wheel and the excitation light source, and a polarization conversion element provided between the wheel and the dichroic mirror to change a polarization direction of the excitation light. The dichroic mirror transmits the excitation light from the excitation light source and guides the excitation light to the wheel, while reflecting light reflected by the wheel and guiding the light to an illumination optical system. It is also disclosed that the phosphor layer emits light of a red wavelength band and light of a green wavelength band.

In an image display device of JP-A-2012-212129, there is also not a little blue light which is not converted by the phosphor layer and which is reflected by a surface of the phosphor layer. Since the blue light also passes through a ¼ wavelength plate, the blue light passes through the dichroic mirror. That is, the blue light is mixed into red light and green light, which is one of the causes of a decrease in color reproducibility.

Accordingly, an object of the present invention is to suppress mixing of blue light into other color light and to improve color reproducibility.

The present invention has been made in view of the above points, and an object of the present invention is to provide a light source device having good color reproducibility with a simple configuration, and a projector.

SUMMARY OF THE INVENTION

According to one aspect of the disclosure, a light source device includes a light emitting element, a fluorescent wheel, a mirror and a control unit. The light emitting element is configured to emit light of a first wavelength band. The fluorescent wheel includes a fluorescent area configured to convert the light of the first wavelength band into fluorescent light and a reflection area configured to reflect the light of the first wavelength band. The fluorescent area and the reflection area are arranged side by side in a circumferential direction. The mirror is configured to reflect a component in a first polarization direction of the light of the first wavelength band and to transmit a component in a second polarization direction of the light of the first wavelength band. The second polarization direction is orthogonal to the first polarization direction. The control unit is configured to control the light emitting element and the fluorescent wheel. The reflection area includes a reflecting surface and a polarization conversion layer including an optical axis and converts a polarization direction of either the incident first polarization direction or the incident second polarization direction to another polarization direction. The optical axis of the polarization conversion layer is inclined by 45 degrees with respect to a polarization direction of the light of the first wavelength band at an irradiation position of the light of the first wavelength band in the fluorescent wheel.

DETAILED DESCRIPTION OF THE PREFERRED EMBODIMENT

First Embodiment

Figure 1:
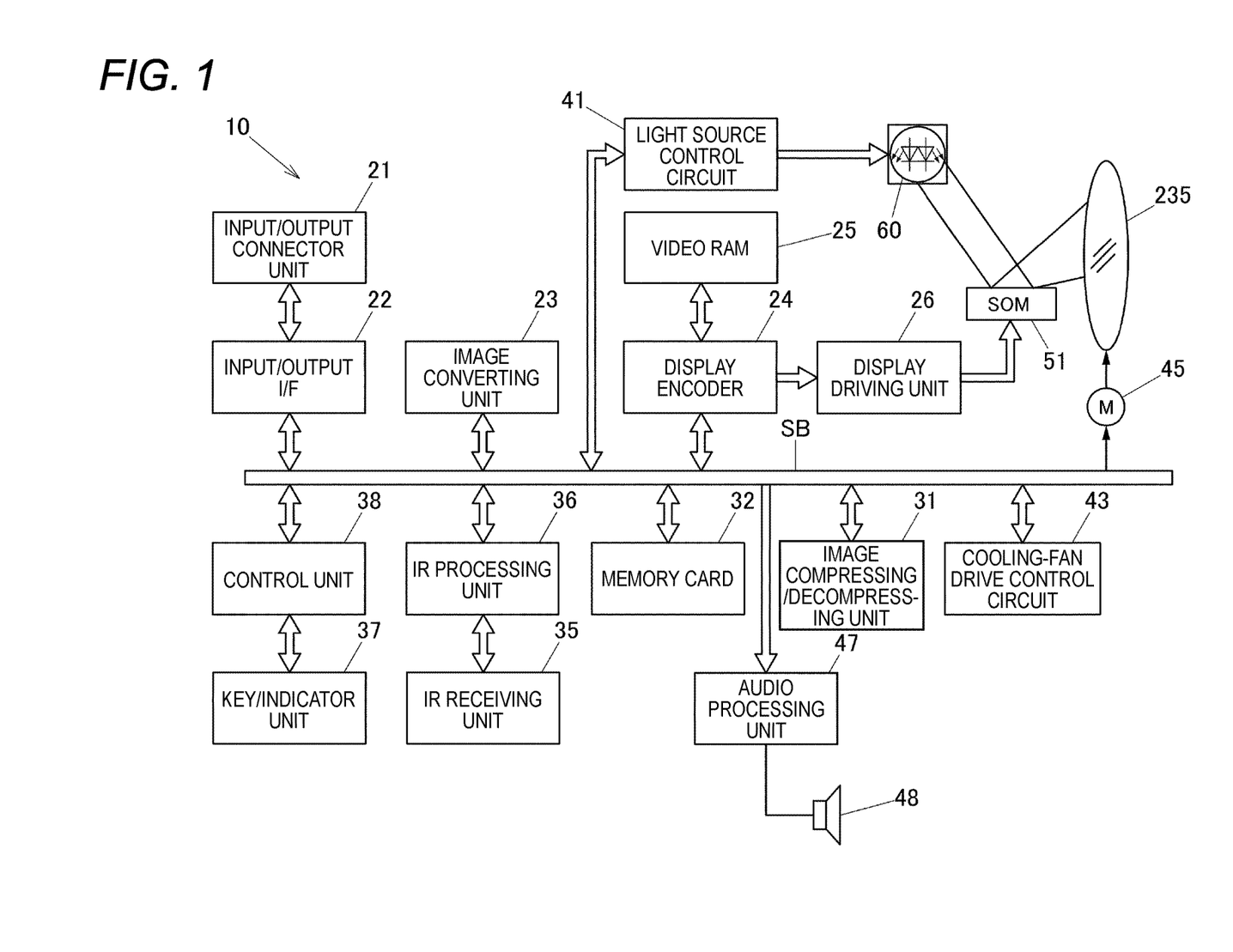
FIG. 1 is a view showing functional circuit blocks of a projector according to a first embodiment of the present invention.

Hereinafter, an embodiment of the present invention will be described. FIG. 1 is a view showing functional circuit blocks of a projector 10. The projector 10 includes a projector control unit including a control unit 38, an input/output interface 22, an image converting unit 23, a display encoder 24, a display driving unit 26, or the like. Image signals of various standards input from an input/output connector unit 21 are transmitted via the input/output interface 22 and a system bus (SB), and are converted into image signals of a predetermined format suitable for display by the image converting unit 23, and are output to the display encoder 24.

After the input image signals are decompressed and are stored in a video RAM 25, the display encoder 24 generates video signals from contents stored in the video RAM 25, and outputs the video signals to the display driving unit 26.

The display driving unit 26 serves as a display element control unit. The display driving unit 26 drives a display element 51 which is a spatial optical modulator (SOM) at an appropriate frame rate corresponding to each image signal output from the display encoder 24. Then, the projector 10 irradiates the display element 51 with a flux of light emitted from a light source device 60 via an optical guiding system, thereby forming optical images by reflected light from the display element 51, and projects the images onto a screen (not shown) via a projection side optical system to be described below. The projection side optical system includes a movable lens group 235, which is driven for zoom adjustment and focus adjustment by a lens motor 45.

An image compressing/decompressing unit 31 performs data compression on luminance signals and color difference signals of the image signals by processing such as ADCT and Huffman encoding, and performs recording processing of sequentially writing the compressed data in a memory card 32 which is a portable recording medium. Further, in a reproduction mode, the image compressing/decompressing unit 31 reads out the image data stored in the memory card 32, and decompresses image data constituting a video in units of one frame. The image compressing/decompressing unit 31 outputs the decompressed image data to the display encoder 24 via the image converting unit 23, thereby making it possible to display the video or the like based on the image data stored in the memory card 32.

The control unit 38 controls the operations of individual circuits included in the projector 10, and includes a CPU, a ROM retaining operation programs such as various settings, a RAM usable as a work memory, or the like.

Operation signals of a key/indicator unit 37 provided on a top panel of a casing and including main keys, indicators, or the like are transmitted directly to the control unit 38. Key operation signals from a remote controller are received by an Ir receiving unit 35 and are demodulated into code signals by an Ir processing unit 36, and the code signals are output to the control unit 38.

The control unit 38 is connected to an audio processing unit 47 via the system bus (SB). The audio processing unit 47 includes a sound source circuit such as a PCM sound source. In a projection mode and the reproduction mode, the audio processing unit 47 converts audio data into analog data, and drives a speaker 48 to output amplified sound.

Further, the control unit 38 controls a light source control circuit 41 which is a light source control unit. The light source control circuit 41 individually controls the operation of an excitation light irradiation device 70 (see FIG. 2) of the light source device 60 such that light of predetermined wavelength bands required for image generation is emitted from the light source device 60. The light source control circuit 41 controls the timing of synchronization of a fluorescent wheel 101 or the like according to the projection mode based on an instruction from the control unit 38.

Further, the control unit 38 controls a cooling-fan drive control circuit 43 such that the cooling-fan drive control circuit 43 performs temperature detection using a plurality of temperature sensors provided in the light source device 60 or the like and controls the rotational speed of a cooling fan according to a result of the temperature detection. The control unit 38 controls the cooling-fan drive control circuit 43 such that the cooling-fan drive control circuit 43 keeps rotating the cooling fan by a timer or the like even after the power of a main body of the projector 10 is turned off, or performs control to turn off the power of the main body of the projector 10, or the like, according to the result of temperature detection by the temperature sensors.

Figure 2:
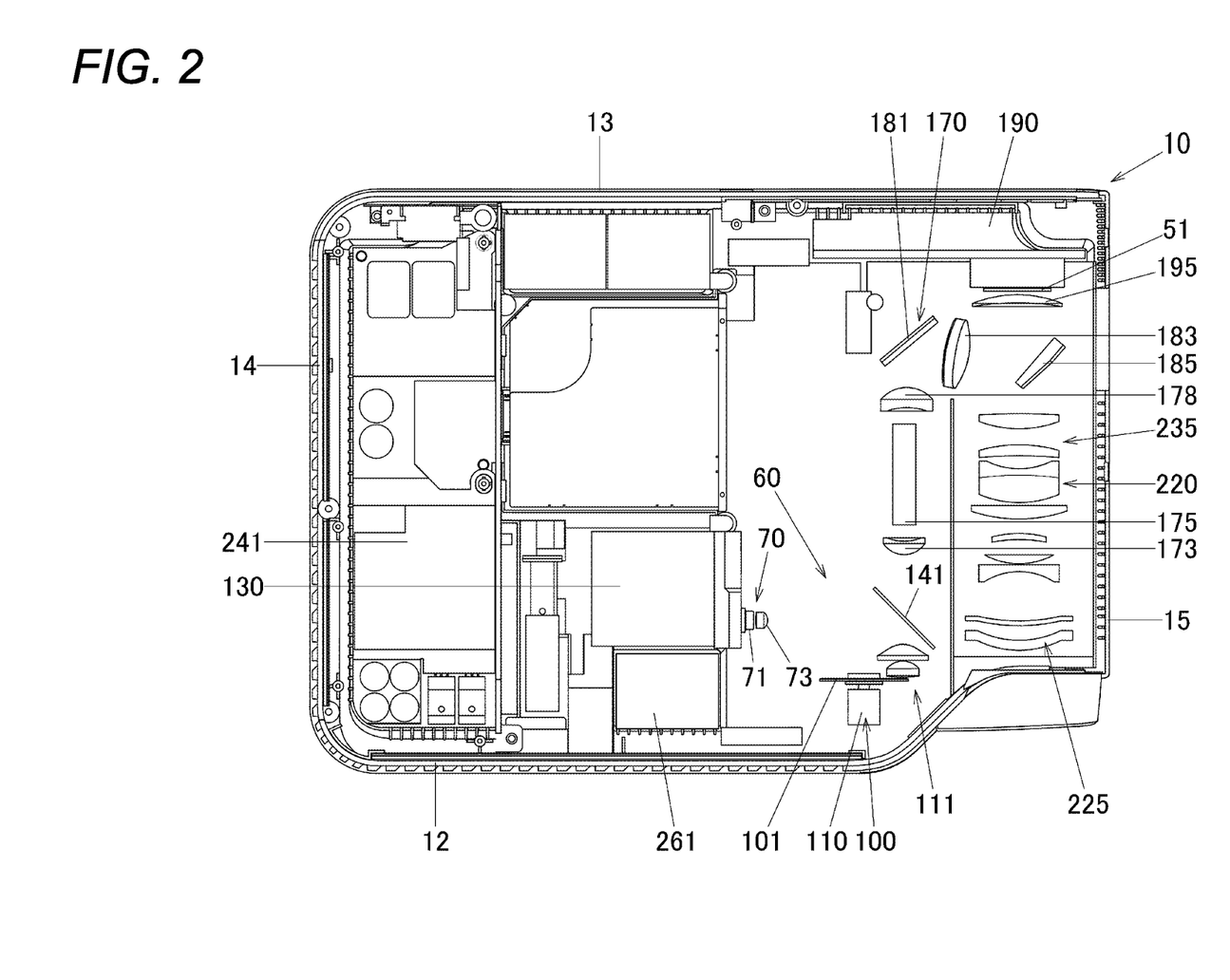
FIG. 2 is a top view schematically showing an inner structure of the projector according to the first embodiment of the present invention.

FIG. 2 is a top view schematically showing an inner structure of the projector 10. The projector 10 includes a control circuit board 241 in the vicinity of a right panel 14. The control circuit board 241 includes a power supply circuit block, a light source control block, or the like. The projector 10 includes the light source device 60 in a substantially central front part of the casing of the projector 10. Further, the projector 10 includes a light source side optical system 170 and a projection side optical system 220.

The light source device 60 includes the excitation light irradiation device 70, a fluorescent wheel device 100, and a dichroic mirror (mirror) 141. The dichroic mirror 141 is disposed on optical axes of light of wavelength bands of individual colors emitted from the excitation light irradiation device 70 and the fluorescent wheel device 100.

The excitation light irradiation device 70 includes blue laser diodes 71, a collimator lens 73, a heat sink 130, and a cooling fan 261. The blue laser diodes 71 are semiconductor light emitting elements disposed such that a rear panel 13 is parallel to emission optical axes of light of a blue wavelength band (light of a first wavelength band) emitted from the blue laser diodes 71. The blue laser diodes 71 emit substantially linearly polarized light of the light of the blue wavelength band (the light of the first wavelength band). Further, the dichroic mirror 141 is provided to be inclined at 45° with respect to the emission optical axes of the blue laser diodes 71, and a polarization axis of the substantially linearly polarized light is directed along an S-polarized direction with respect to the inclined dichroic mirror 141.

The collimator lens 73 is disposed on the optical axes of the blue laser diodes 71, and converts the light of the blue wavelength band emitted from the blue laser diodes 71 into parallel light so as to improve the directivity of the light.

The heat sink 130 is disposed on a right panel 14 side behind the blue laser diodes 71. The cooling fan 261 is disposed between the heat sink 130 and a front panel 12. The blue laser diodes 71 are cooled by the cooling fan 261 and the heat sink 130.

Figure 3:
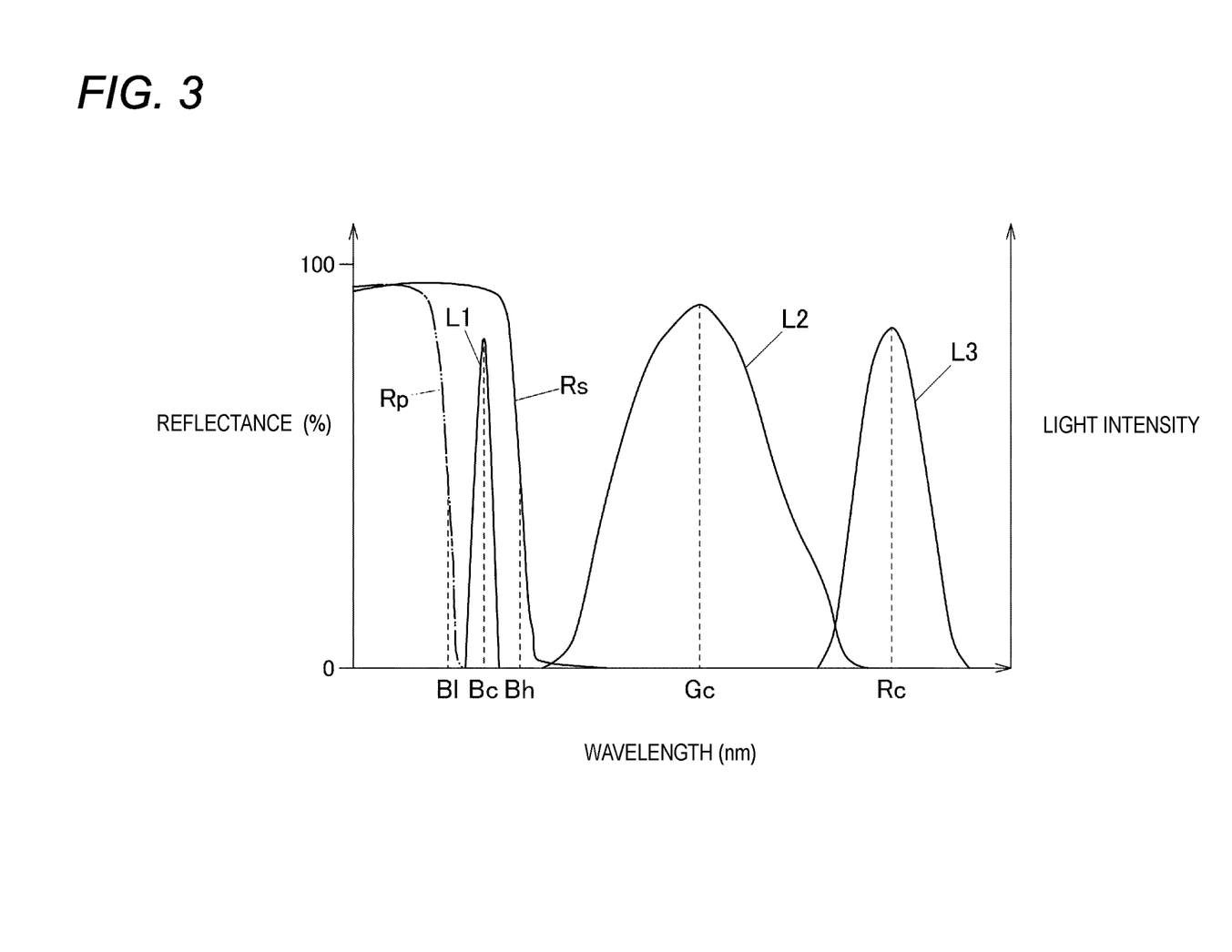
FIG. 3 is a view showing reflection characteristics of a dichroic mirror according to the first embodiment of the present invention.

Here, reflection characteristics of the dichroic mirror 141 will be described. FIG. 3 shows distribution curves of light of a blue wavelength band L1, light of a green wavelength band L2, and light of a red wavelength band L3, a reflection characteristic Rs of an S-polarized component of the dichroic mirror 141 in a case where an incident angle is 45°, and a reflection characteristic Rp of a P-polarized component of the dichroic mirror 141 in a case where the incident angle is 45°. A left vertical axis in FIG. 3 represents the reflectance (%) of the reflection characteristic Rs of the S-polarized component and the reflection characteristic Rp of the P-polarized component, and a right vertical axis represents the light intensity of the light of the blue wavelength band L1, the light of the green wavelength band L2, and the light of the red wavelength band L3. The horizontal axis represents wavelength (nm). For example, a peak wavelength Bc of the light of the blue wavelength band L1 is 450 nm, a half-value wavelength Bl of the reflection characteristic Rp of the P-polarized component of the dichroic mirror 141 is 435 nm, and a half-value wavelength Bh of the reflection characteristic Rs of the S-polarized component of the dichroic mirror 141 is 465 nm. A peak wavelength Gc of the light of the green wavelength band L2 is 540 nm, and a peak wavelength Rc of the light of the red wavelength band L3 is 620 nm.

As shown in the reflection characteristic Rs of the S-polarized component, the dichroic mirror 141 reflects the S-polarized component of the light of the blue wavelength band L1 and transmits the light of the green wavelength band L2 and the light of the red wavelength band L3. As shown in the reflection characteristic Rp of the P-polarized component, the dichroic mirror 141 transmits the P-polarized component of the light of the blue wavelength band, the light of the green wavelength band L2, and the light of the red wavelength band L3. Further, the dichroic mirror 141 can reflect more components on a long wavelength side of the S-polarized component than those of the P-polarized component of the light of the blue wavelength band. The dichroic mirror 141 of the present embodiment reflects the component in an S-polarized direction (a first polarization direction) and transmits the component in a P-polarized direction (a second polarization direction).

Referring back to FIG. 2, the dichroic mirror 141 reflects most of the S-polarized light of the blue wavelength band emitted from the blue laser diodes 71, and guides the light to a fluorescent wheel 101 side. The reflected light of the blue wavelength band reflected by the dichroic mirror 141 is collected by a condensing lens group 111 and radiated onto the fluorescent wheel 101.

The fluorescent wheel 101 is disposed so as to be substantially parallel to the front panel 12, that is, so as to be orthogonal to an optical axis of incident light from the dichroic mirror 141. A motor 110 rotationally drives the fluorescent wheel 101. The condensing lens group 111 condenses the light of the blue wavelength band emitted from the excitation light irradiation device 70 on the fluorescent wheel 101 while condensing fluorescent light and reflected light emitted from the fluorescent wheel 101 in a direction of the rear panel 13.

Figure 4:
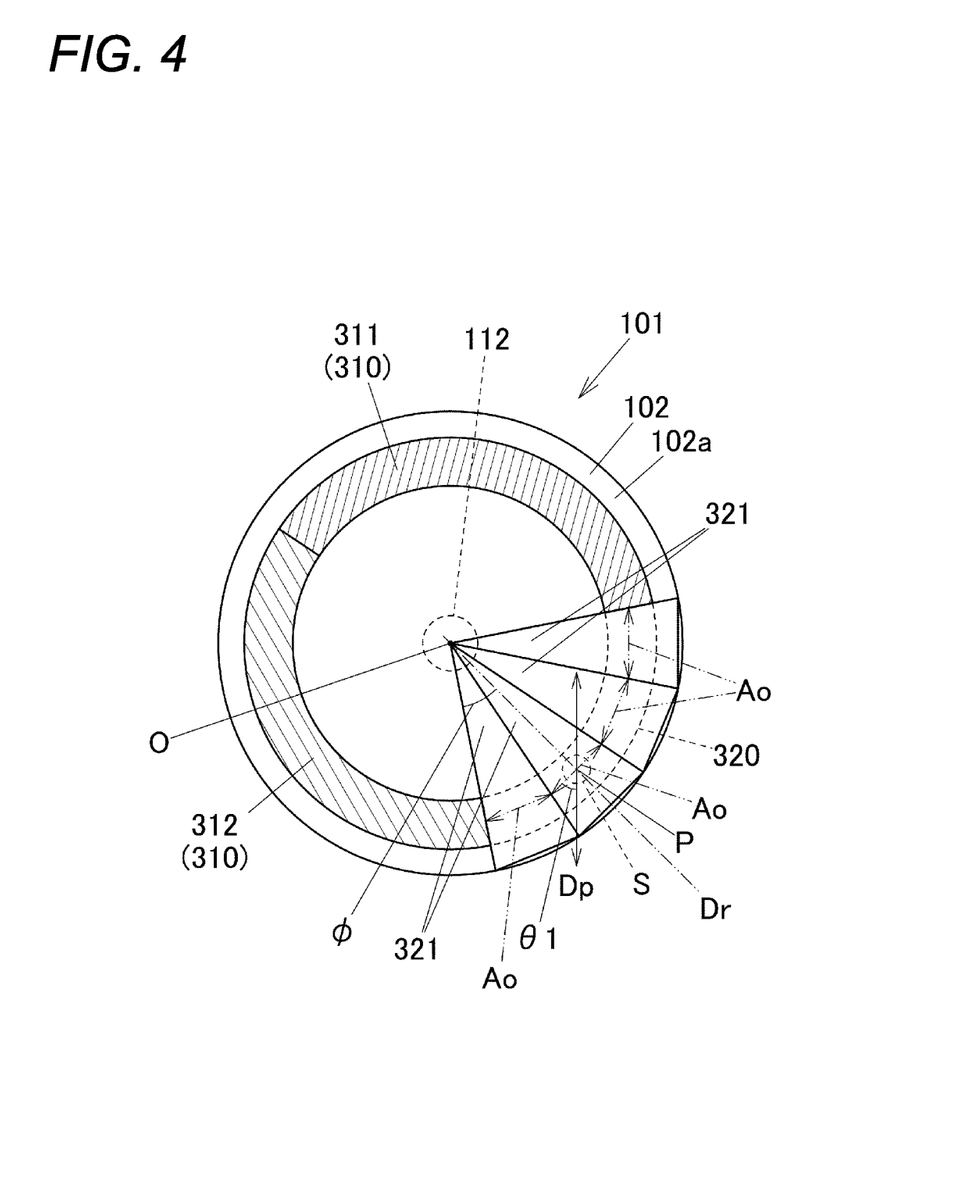
FIG. 4 is schematic view of a fluorescent wheel according to the first embodiment of the present invention.

Here, the fluorescent wheel 101 will be described. FIG. 4 is schematic view of the fluorescent wheel 101 as viewed from a front surface side (a side on which the excitation light of FIG. 2 is incident). The fluorescent wheel 101 is formed in a substantially disk shape. A central axis 112 of the fluorescent wheel 101 is fixed to a shaft portion of the motor 110 shown in FIG. 2. A base member 102 of the fluorescent wheel 101 may be formed of a metal such as copper or aluminum. The surface of the base member 102 on a dichroic mirror 141 side is a reflecting surface 102a which is mirror processed by silver deposition or the like.

The fluorescent wheel 101 includes a fluorescent area 310 which receives the light of the blue wavelength band as the excitation light and emits fluorescent light, and a reflection area 320 which reflects the light of the blue wavelength band, on a reflecting surface 102a side in the vicinity of an outer peripheral edge. The fluorescent area 310 includes a green fluorescent area 311 (a first fluorescent area) and a red fluorescent area 312 (a second fluorescent area). The green fluorescent area 311, the red fluorescent area 312, and the reflection area 320 are arranged side by side in a circumferential direction on the reflecting surface 102a of the fluorescent wheel 101. The green fluorescent area 311 and the red fluorescent area 312 are respectively formed in an arc shape. The reflection area 320 is an arc-shaped area shown by a broken line and disposed between both ends of the fluorescent area 310 in the circumferential direction.

When the green fluorescent area 311 is irradiated with the light of the blue wavelength band which is emitted from the excitation light irradiation device 70 and which is reflected by the dichroic mirror 141, the light of the green wavelength band (the light of the second wavelength band) is emitted as fluorescent light. Further, when the red fluorescent area 312 is irradiated with the light of the blue wavelength band, the light of the red wavelength band (the light of the third wavelength band) whose wavelength band is adjacent to that of the light of the green wavelength band is emitted as fluorescent light. The reflection area 320 reflects the light of the blue wavelength band.

The reflection area 320 is formed in an area including a diffusion layer (not shown) provided on the reflecting surface 102a and a plurality of ¼ wavelength plates 321 provided as a polarization conversion layer on the diffusion layer. Each ¼ wavelength plate 321 is formed in a substantially isosceles triangle shape and the ¼ wavelength plates 321 are arranged side by side in the circumferential direction of the fluorescent wheel 101. Each ¼ wavelength plate 321 has a linear optical axis Ao in a direction substantially parallel to a base of the isosceles triangle shape. The reflection area 320 of the present embodiment is formed by a plurality of lines, and the plurality of lines are formed by refracting the optical axis Ao along the circumferential direction.

For the light of the blue wavelength band radiated onto an area S centered on a position P in the reflection area 320, an angle $\theta1$ between a polarization direction Dp and the optical axis Ao is approximately 45°. A rotation angle $\phi$ is an angle from a radial direction Dr passing through the position P (the position where the angle between the polarization direction Dp of the light of the blue wavelength band and the circumferential direction of the fluorescent wheel 101 is 45°) shown in FIG. 4 to a boundary between the red fluorescent area 312 and the reflection area 320. The angle $\theta1$ varies within a stable range with 45° as a center value according to the rotation angle $\phi$ which varies with the rotation of the fluorescent wheel 101. The ¼ wavelength plate 321 shifts the phase of the light of the blue wavelength band incident at the angle $\theta1=45°$ by ¼ wavelength, and transmits the light of the blue wavelength band to the reflecting surface 102a side as elliptical polarized light. Then, the light of the blue wavelength band is reflected by the reflecting surface 102a and passes through the ¼ wavelength plate 321 again. Therefore, the light of the blue wavelength band incident on a reflection area 320A from the condensing lens group 111 is emitted from the reflection area 320A toward the condensing lens group 111 as linearly polarized light whose polarization direction is converted by 90°.

The light of the green wavelength band emitted from the green fluorescent area 311, the light of the red wavelength band emitted from the red fluorescent area 312, and the light of the blue wavelength band reflected by the reflection area 320 are emitted toward the dichroic minor 141 via the condensing lens group 111. The dichroic mirror 141 transmits the light of the green wavelength band and the light of the red wavelength band emitted from the fluorescent wheel 101, and guides the light to the light source side optical system 170 as light source light. The dichroic mirror 141 transmits most of the P-polarized light of the blue wavelength band emitted from the fluorescent wheel 101 and guides the light to the light source side optical system 170 as light source light.

The light source side optical system 170 includes a condensing lens 173, a light tunnel 175, a condensing lens 178, an optical-axis changing mirror 181, a condensing lens 183, an irradiation mirror 185, a condensing lens 195, or the like. The condensing lens 195 is also a part of the projection side optical system 220 since the condensing lens 195 emits image light emitted from the display element 51 disposed on a side of the condensing lens 195 close to the rear panel 13 toward the projection side optical system 220.

The condensing lens 173 is disposed in the vicinity of an entrance of the light tunnel 175, and condenses the light of the blue wavelength band, the light of the green wavelength band, and the light of the red wavelength band transmitted through the dichroic mirror 141. The light of the wavelength bands of the individual colors collected by the condensing lens 173 is emitted toward the light tunnel 175.

The optical-axis changing mirror 181 is disposed behind the condensing lens 178 which is on the optical axis on a side of the light tunnel 175 close to the rear panel 13. A flux of light emitted from an exit of the light tunnel 175 is condensed by the condensing lens 178, and then the optical axis is changed toward a left panel 15 side by the optical-axis changing mirror 181.

The flux of light reflected by the optical-axis changing mirror 181 is condensed by the condensing lens 183, and then is radiated onto the display element 51 at a predetermined angle through the condensing lens 195 by the irradiation mirror 185. In the present embodiment, a DMD is used as the display element 51. The display element 51 is cooled by a heat sink 190 provided on a rear panel 13 side.

The light source light radiated onto an image forming surface of the display element 51 by the light source side optical system 170 is reflected by the image forming surface of the display element 51, and projected onto the screen as projection light via the projection side optical system 220. Here, the projection side optical system 220 includes the condensing lens 195, the movable lens group 235, a fixed lens group 225, or the like. The movable lens group 235 is formed movably by a lens motor. The movable lens group 235 and the fixed lens group 225 are incorporated in a fixed lens barrel. Therefore, the fixed lens barrel including the movable lens group 235 is a variable focus lens, and is formed to be capable of performing zoom adjustment and focus adjustment.

By configuring the projector 10 as described above, when light is emitted from the excitation light irradiation device 70 while rotating the fluorescent wheel 101, the light of the red, green, and blue wavelength bands is incident on the display element 51 via the dichroic mirror 141 and the light source side optical system 170. Therefore, the DMD, which is the display element 51 of the projector 10, can project the color image on the screen by time-divisionally displaying the light of each color according to the data.

Modification of First Embodiment

Figure 5:
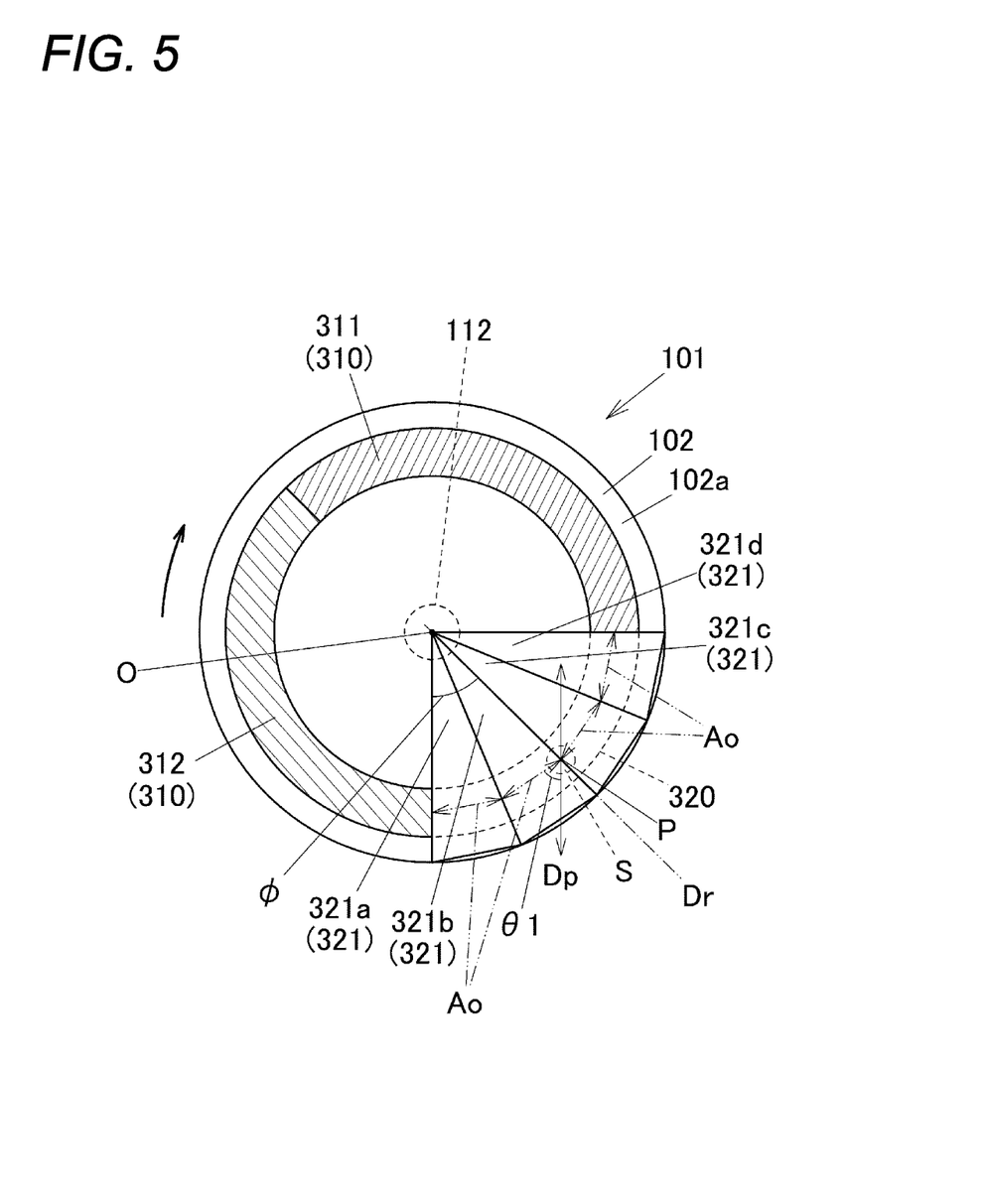
FIG. 5 is a view showing a state where the fluorescent wheel of FIG. 4 is rotated according to a modification of the first embodiment of the present invention.

Next, a modification of the first embodiment will be described. FIG. 5 is a view showing a state where the fluorescent wheel 101 of FIG. 4 is rotated. In a case where the fluorescent wheel 101 is used, the angle θ1 between the polarization direction Dp of the light of the blue wavelength band incident on the fluorescent wheel 101 and the optical axis Ao of each ¼ wavelength plate 321 changes with time, and 45° is set as a substantially central value according to the rotation of the fluorescent wheel 101.

As shown in FIG. 4, when the angle θ1 is 45°, the light of the blue wavelength band emitted from the reflection area 320 becomes linearly polarized light whose polarization direction is rotated by 90° with respect to the incident light. On the other hand, as shown in FIG. 5, when the angle θ1 is larger than 45°, the light of the blue wavelength band emitted from the reflection area 320 becomes elliptical polarized light; when the angle θ1 is smaller than 45°, the light of the blue wavelength band emitted from the reflection area 320 becomes elliptical polarized light in a circumference opposite to that when the angle θ1 is larger than 45°.

The rotation direction of the elliptical polarized light varies depending on whether the optical axis Ao of the ¼ wavelength plate 321 shown in FIG. 5 corresponds to either a high-speed axis or a low-speed axis.

Figure 6:
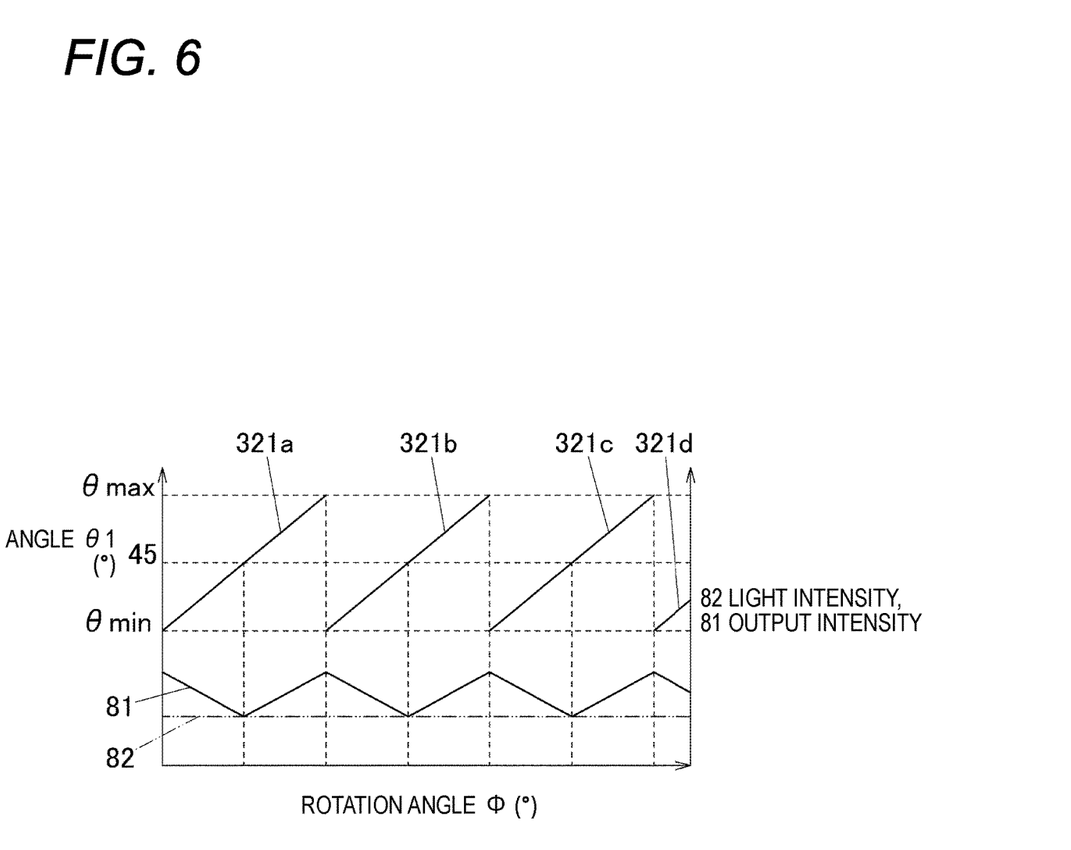
FIG. 6 is a view showing a relation of a rotation angle, an angle between a polarization direction and an optical axis, an output intensity of excitation light, and an output intensity of the excitation light transmitted through the dichroic mirror according to the first embodiment of the present invention.

FIG. 6 is a view showing a relation of the rotation angle φ and the angle θ1 of the fluorescent wheel 101, an output intensity 81 of an excitation light, and an output intensity 82 of the excitation light transmitted through the dichroic mirror 141. The angle θ1 in each of the ¼ wavelength plates 321a to 321d increases as the rotation angle φ increases. Further, since the area S irradiated with the light of the blue wavelength band moves in order from the ¼ wavelength plates 321a to 321d along with the rotation of the fluorescent wheel 101, the angle θ1 changes from a maximum value to a minimum value each time the ¼ wavelength plates 321a to 321d irradiated with the light of the blue wavelength band are switched.

As the angle θ1 is smaller or larger than 45°, since the light of the blue wavelength band emitted from the reflection area 320 contains many elliptical polarized light components, the transmittance of the light of the blue wavelength band reflected by the fluorescent wheel 101 is reduced in the dichroic mirror 141. Therefore, the light intensity of the light of blue wavelength band emitted from the light source device 60 as light source light toward the light source side optical system 170 in FIG. 2 is maximized when the angle θ1 is 45°, and decreases as the angle θ1 is smaller or larger than 45°. Then, the luminance of the light of the blue wavelength band cannot be sufficiently ensured within a preset segment period in time division in order to emit the light of the blue wavelength band.

Therefore, in the present embodiment, the output intensity of the light of the blue wavelength band emitted from the blue laser diodes 71 varies according to the change of the angle θ1. The output intensity 81 of the excitation light represents the intensity of the light of the blue wavelength band emitted from the blue laser diodes 71. The output intensity 81 is set to be minimum when the angle θ1 is 45°, and is set to be higher as the angle θ1 is smaller or larger than 45°.

Accordingly, as shown in FIG. 6, the light intensity 82 of the light of the blue wavelength band reflected by the reflection area 320 and transmitted through the dichroic mirror 141 can be substantially smoothed.

Incidentally, as shown in FIG. 3, if the range which reflects the S-polarized light of the dichroic mirror 141 and which transmits the P-polarized light of the dichroic mirror 141 is enlarged, even in a case where the light of the blue wavelength band reflected by the reflection area 320 includes elliptical polarized light due to the variation of the angle θ1, since the elliptical polarized light is a vibration close to the polarization direction of the P-polarized light, most of the light of the blue wavelength band can be transmitted by the dichroic mirror 141.

According to the present embodiment, since the optical axis Ao substantially in the circumferential direction along the circumferential direction of the fluorescent wheel 101 can be formed by cutting the ¼ wavelength plates 321, it is possible to form the reflection area 320 on the fluorescent wheel 101 and improve color reproducibility by a simple process.

Second Embodiment

Figure 7A:
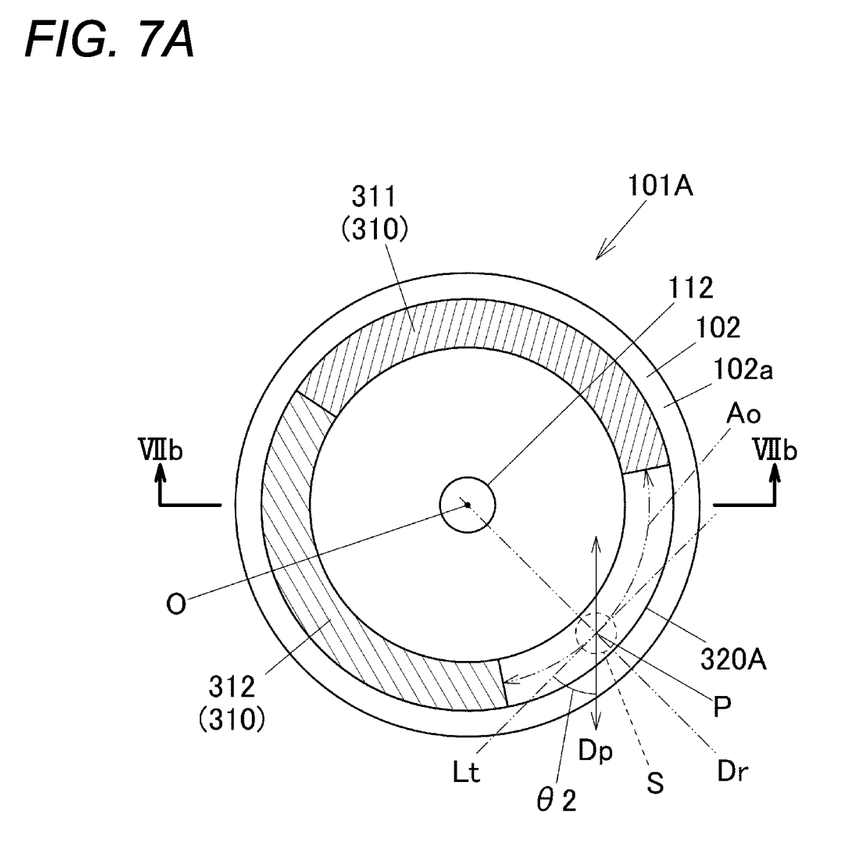
FIG. 7A is a schematic view of a fluorescent wheel according to a second embodiment of the present invention and shows a front view.
Figure 7B:
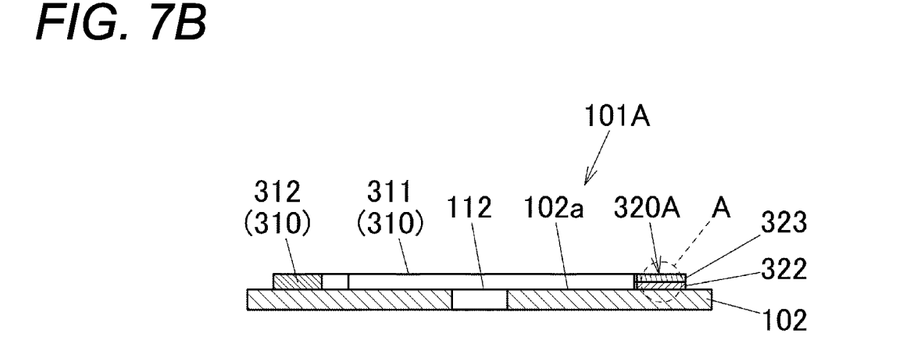
FIG. 7B is a schematic view of the fluorescent wheel according to the second embodiment of the present invention and shows a cross sectional view taken along a line VIIb-VIIb of FIG. 7A.

Next, a second embodiment will be described. The light source device 60 of the present embodiment includes a fluorescent wheel 101A instead of the fluorescent wheel 101 of the first embodiment. FIG. 7A is a schematic view of the fluorescent wheel 101A as viewed from the front surface side (the side on which the light of the blue wavelength band is incident in FIG. 2). FIG. 7B is a schematic view of a cross section taken along a line VIIb-VIIb of the fluorescent wheel 101A of FIG. 7A. In the description of the fluorescent wheel 101A, the same components as those of the fluorescent wheel 101 in the first embodiment are denoted by the same reference numerals, and the descriptions thereof are omitted or simplified.

The fluorescent wheel 101A is formed in a substantially disk shape similarly to the fluorescent wheel 101. The fluorescent wheel 101 includes the fluorescent area 310 which receives the light of the blue wavelength band as the excitation light and emits the fluorescent light, and the reflection area 320A which reflects the light of the blue wavelength band on the reflecting surface 102a side in the vicinity of the outer circumferential edge. The fluorescent area 310 includes the green fluorescent area 311 (the first fluorescent area) and the red fluorescent area 312 (the second fluorescent area). The green fluorescent area 311, the red fluorescent area 312, and the reflection area 320A are arranged side by side in the circumferential direction on the reflecting surface 102a of the fluorescent wheel 101A. Therefore, the green fluorescent area 311, the red fluorescent area 312, and the reflection area 32A are respectively formed in an arc shape.

As shown in FIG. 7B, the reflection area 320A includes a diffusion layer 322 formed on the reflecting surface 102a and a polarization conversion layer 323 formed on the diffusion layer 322. The diffusion layer 322 can be formed by disposing a member provided with fine irregularities by sandblasting or the like on a surface of a transparent material such as glass or resin. The polarization conversion layer 323 has a function of converting the polarization direction of the transmitted light. One surface of the polarization conversion layer 323 is in contact with a gas such as air, and the diffusion layer 322 is disposed on the other surface. The polarization conversion layer 323 is disposed on the one surface of the diffusion layer 322, and the other surface is in contact with the base member 102. Therefore, heat is easily radiated from the one surface of the polarization conversion layer 323 and also from the other surface of the diffusion layer 322. Further, since the diffusion layer 322 is frosted glass and the one surface thereof is not smooth but rough, the one surface of the diffusion layer 322 and the other surface of the polarization conversion layer 323 are not tightly adhered to each other, and some gaps are opened. Therefore, heat can be efficiently radiated from between the one surface of the diffusion layer 322 and the other surface of the polarization conversion layer 323. A side surface of the polarization conversion layer 323 not irradiated with the light of the blue wavelength band (the light of the first wavelength band) L1 is fixed by an adhesive or the like.

Figure 8:
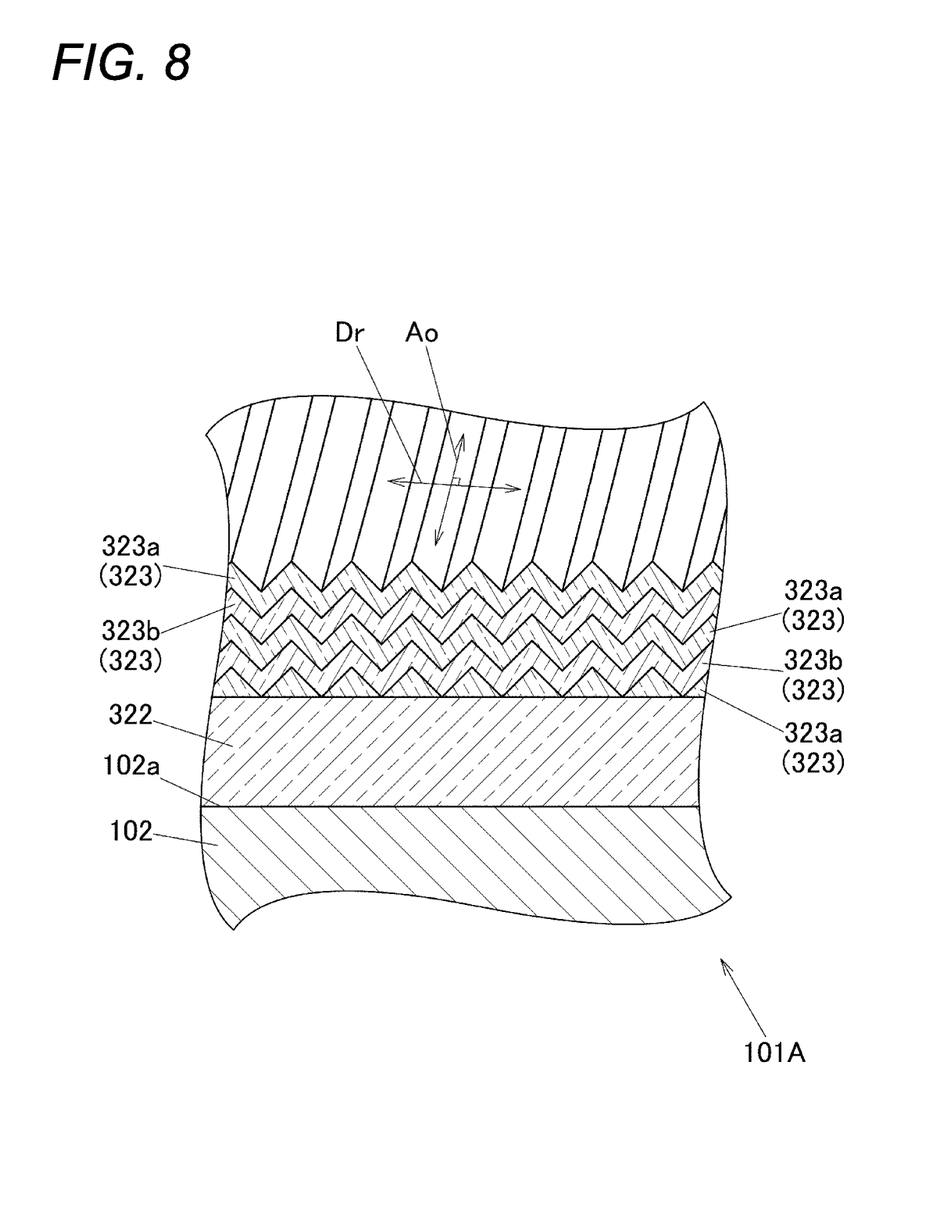
FIG. 8 is an enlarged cross sectional perspective view of a part A of FIG. 7B according to the second embodiment of the present invention.

FIG. 8 is an enlarged perspective view of a portion A of FIG. 7B in the cross section taken along the line VIIb-VIIb of the fluorescent wheel 101A. The polarization conversion layer 323 has a structure in which first materials 323a and second materials 323b are alternately laminated in substantially the same thickness. The first materials 323a and the second materials 323b are materials having different refractive indexes. Each of the first materials 323a and the second materials 323b is bent in a bellows shape in which convex portions and concave portions are alternately repeated in the radial direction Dr of the fluorescent wheel 101A in each cross sectional view. The first material 323a and the second material 323b are formed such that positions of the convex portions coincide with each other with respect to the lamination direction, and positions of the concave portions also coincide with each other with respect to the lamination direction. In the present embodiment, the periods of the convex portions and concave portions of the first material 323a and the second material 323b are disposed at substantially equal intervals with respect to the radial direction Dr. The first material 323a in contact with the diffusion layer 322 is formed in a substantially triangular shape when viewed in a cross section.

Further, the top of each convex portion and the bottom of each concave portion of the first material 323a and the second material 323b are extended while being curved in an arc shape (an arcuate shape) so as to be parallel to a circumferential direction of the fluorescent wheel 101A. In the present embodiment, the curved direction of the convex and the concave portion parallel to the circumferential direction is the optical axis Ao, and the direction orthogonal to the optical axis Ao coincides with the radial direction Dr shown by a two-dot chain line passing through a center O of the fluorescent wheel 101A. Thus, the polarization conversion layer 323 is formed by a photonics crystal wavelength plate configured such that the optical axis Ao is directed in a direction along the circumferential direction of the fluorescent wheel 101A.

In FIG. 7A, the light of the blue wavelength band collected by the condensing lens group 111 is radiated on a range of the area S centered on the position P in the reflection area 320A. The fluorescent wheel 101A is disposed at a position where an angle θ2 between the polarization direction Dp of the light of the blue wavelength band radiated on the area S and a tangent line Lt in the circumferential direction and at the position P is 45°. By setting the angle θ2 to 45°, a phase conversion effect in the polarization conversion layer 323 can be enhanced. The polarization conversion layer 323 of the present embodiment shifts the phase of the light of the blue wavelength band incident at the angle θ2=45° by ¼ wavelength, and transmits the light of the blue wavelength band to the reflecting surface 102a side as the elliptical polarized light. Then, the light of the blue wavelength band is reflected by the reflecting surface 102a and passes through the polarization conversion layer 323 again. Therefore, the light of the blue wavelength band incident on the reflection area 320A from the condensing lens group 111 is emitted from the reflection area 320A toward the condensing lens group 111 as linearly polarized light whose polarization direction is converted by 90°.

As described above, in the present embodiment, the reflection area 320A of the fluorescent wheel 101A includes the reflecting surface 102a and the polarization conversion layer 323 having the optical axis Ao directed in a direction along the circumferential direction, and the light of the blue wavelength band is incident on a position where the angle θ2 between the optical axis Ao of the light of the blue wavelength and the circumferential direction of the fluorescent wheel 101A is 45°. The optical axis Ao of the polarization conversion layer 323 is formed in a curved direction parallel to the circumferential direction. Therefore, even when the fluorescent wheel 101A rotates, the angle θ2 between the polarization direction Dp and the circumferential direction at the position P can be made constant when the reflection area 320A is irradiated with the light of the blue wavelength band, and the polarization direction of the light of the blue wavelength band reflected by the reflection area 320 can be stably converted. Therefore, most of the light reflected by the reflection area can be transmitted as P-polarized light by the dichroic mirror 141 to prevent a decrease in color reproducibility.

In the embodiments, one blue laser diode 71 is shown in FIG. 2, but the excitation light irradiation device 70 may be an array-shaped light source where a plurality of blue laser diodes 71 are disposed.

Figure 9:
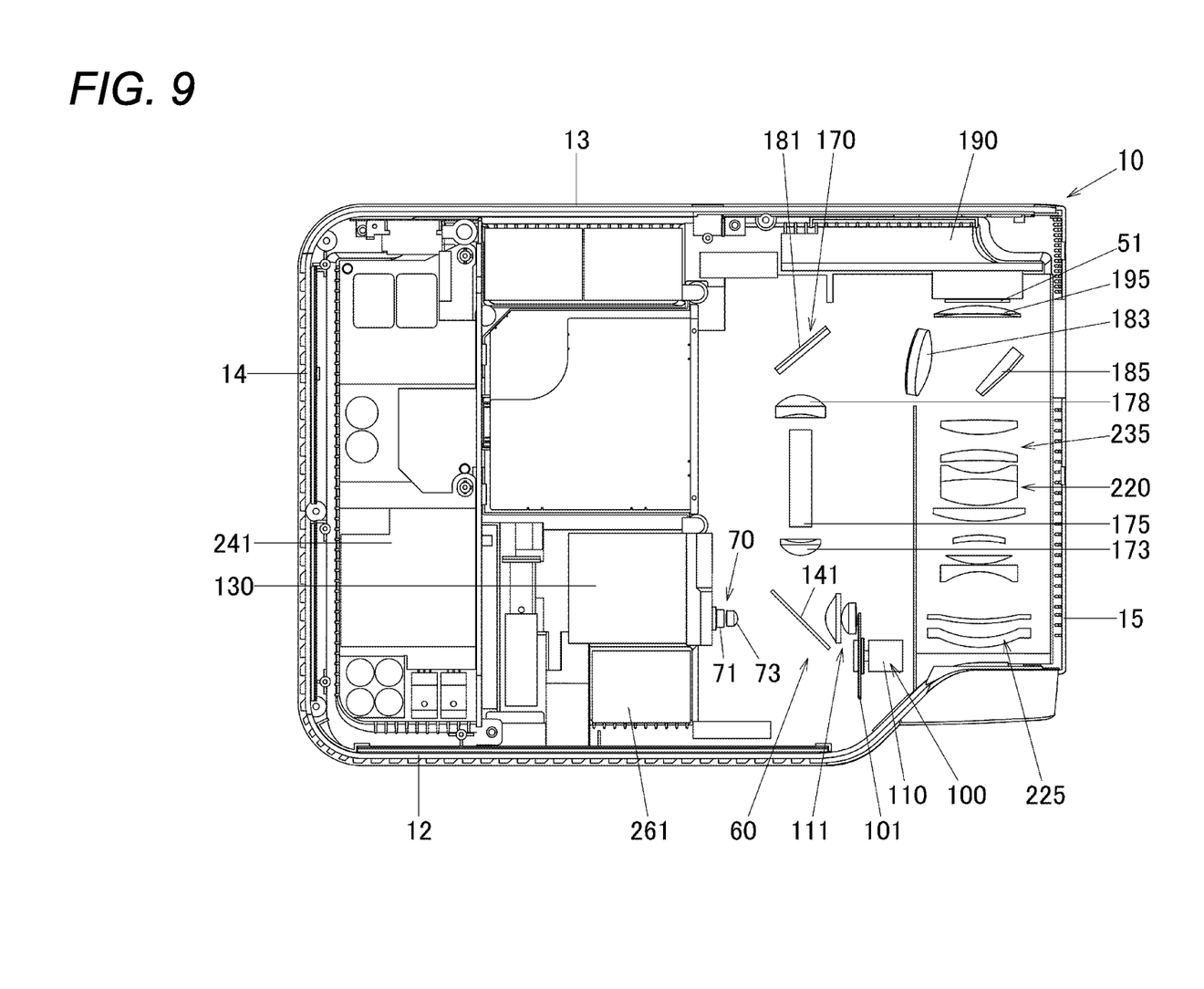
FIG. 9 is a top view schematically showing an inner structure of a projector according to a modification of the present invention.

FIG. 9 is a top view schematically showing an inner structure of the projector 1 according to a modification of the present invention. As shown in FIG. 9, the fluorescent wheel 101 may be disposed so as to face the blue laser diodes 71, and the light source side optical system 170 may be disposed in a reflection direction of the dichroic mirror 141. In this case, the dichroic mirror 141 transmits the P-polarized component of the light of the blue wavelength band emitted from the blue laser diodes 71, reflects the S-polarized component, and reflects the fluorescent light.

The shape of the ¼ wavelength plate 321 in the first embodiment is not limited to the isosceles triangle shape but may be other shapes such as a short arc shape or a rectangular shape as long as the ¼ wavelength plate 321 fits within the reflection area 320 having substantially the same diameter as the fluorescent area 310. The ¼ wavelength plate 321 may be divided into five or more plates in the radial direction of the fluorescent wheel 101, or may be divided into three or less plates.

Although FIG. 5 shows a structure where the first materials 323a and the second materials 323b have a total of five layers, the thickness of each layer can be about half of the wavelength of light, or a large number of six or more layers may be laminated.

As described above, the light source device 60 and the projector 10 including the light source device 60 according to the embodiments of the present invention include: the light emitting element that is configured to emit light of a first wavelength band; the fluorescent wheel where a fluorescent area configured to convert the light of the first wavelength band into fluorescent light and the reflection area configured to reflect the light of the first wavelength band are arranged side by side in a circumferential direction; the mirror that is configured to reflect a component in a first polarization direction of the light of the first wavelength band and transmit a component in a second polarization direction orthogonal to the first polarization direction; and the control unit that is configured to control an operation of the light emitting element and the fluorescent wheel. The reflection area includes a reflecting surface and a polarization conversion layer including an optical axis and converts a polarization direction of either the incident first polarization direction or the incident second polarization direction to another polarization direction, and the optical axis of the polarization conversion layer is inclined by about 45 degrees with respect to the polarization direction of the light of the first wavelength band at an irradiation position of the light of the first wavelength band in the fluorescent wheel.

Therefore, since the light of the blue wavelength band, the light of the green wavelength band, and the light of the red wavelength band become the same optical path from the excitation light irradiation device 70 (a light emitting source), the structure is simple, the number of components is small, and the size of the entire device can be reduced. In addition, since mixing of the light of the blue wavelength band can be reduced when the light of the green wavelength band or the light of the red wavelength band is emitted as light source light, the color reproducibility can be improved.

The polarization conversion layer is thrilled by a plurality of polarization conversion layers divided in the circumferential direction, and each optical axis of the plurality of polarization conversion layers is at a predetermined angle with respect to the circumferential direction.

Further, since the light source device 60 formed by arranging the plurality of wave plates 321a to 321d having the linear optical axis Ao side by side in the circumferential direction can be formed by cutting the ¼ wavelength plate 321, the polarization conversion layer can be formed on the fluorescent wheel 101 by a simple process.

Further, as the angle between the polarization direction of the light of the first wavelength band and the circumferential direction is smaller or larger than 45° at the position on which the light of the first wavelength band is incident, the light source device 60 emitting the light of the first wavelength band with a high output can substantially smooth the light intensity 82 of the light of the first wavelength band transmitted through the dichroic mirror 141 and improve color reproducibility as light source light.

The light source device 60 formed such that the optical axis Ao of the polarization conversion layer 323 is curved in parallel to the circumferential direction can stably convert the polarization direction of the light of the first wavelength band reflected by the reflection area 320.

In the light source device 60 where the first polarization direction is the S-polarized direction and the second polarization direction is the P-polarized direction, the dichroic mirror 141 reflects the light of the first wavelength band in the S-polarized direction and transmits the light of the first wavelength band in the P-polarized direction, in a case where the reflection characteristic in the S-polarized direction is better than that in the P-polarized direction, even in a configuration where the light emitting element and the fluorescent wheel do not face each other as shown in FIG. 2, the excitation light can be efficiently utilized as light source light.

In a case where the light source device 60 where the diffusion layer is disposed between the reflecting surface 102a and the polarization conversion layer is used as light source light by reflecting the excitation light by the fluorescent wheels 101, 101A, luminance distribution can be made uniform by reducing speckle noise or the like.

Further, for the light source device 60 including the first fluorescent area which is excited by the light of the first wavelength band and emits the light of the second wavelength band and the second fluorescent area which is excited by the light of the first wavelength band and emits the light of the third wavelength band, in the fluorescent area 310, the light source device 60 can emit light of three types of wavelength bands from the fluorescent wheels 101, 101A including the reflection area 320.

The light source device 60 where the light of the first wavelength band is the light of the blue wavelength band, the light of the second wavelength band is the light of the green wavelength band, and the light of the third wavelength band is the light of the red wavelength band can form a color image.

Also, the above-described embodiments have been presented by way of example only, and are not intended to limit the scope of the inventions. The above-described novel embodiments may be embodied in a variety of other forms; furthermore, various omissions, substitutions and changes in the above-described embodiments may be made without departing from the spirit of the inventions. The above-described embodiments and modifications thereof are included in the scope and gist of the inventions, and are included in the scope of inventions disclosed in claims and equivalents of them.

What is claimed is:

1. A light source device comprising:
a light emitting element that is configured to emit light of a first wavelength band;
a fluorescent wheel that includes a fluorescent area configured to convert the light of the first wavelength band into fluorescent light and a reflection area configured to reflect the light of the first wavelength band, the fluorescent area and the reflection area being arranged side by side in a circumferential direction;
a mirror that is configured to reflect a component in a first polarization direction of the light of the first wavelength band and to transmit a component in a second polarization direction of the light of the first wavelength band, the second polarization direction being orthogonal to the first polarization direction; and
a control unit that is configured to control the light emitting element and the fluorescent wheel,
wherein the reflection area includes a reflecting surface and a polarization conversion layer including an optical axis and converts a polarization direction of one of the incident first polarization direction and the incident second polarization direction to another polarization direction,
wherein the optical axis of the polarization conversion layer is inclined by 45 degrees with respect to a polarization direction of the light of the first wavelength band at an irradiation position of the light of the first wavelength band in the fluorescent wheel, and
wherein the optical axis of the polarization conversion layer is formed so as to be curved parallel to the circumferential direction.

2. The light source device according to claim 1, wherein the polarization conversion layer comprises a plurality of polarization conversion layers divided in the circumferential direction.

3. The light source device according to claim 2, wherein the polarization conversion layer comprises a plurality of wavelength plates arranged side by side in the circumferential direction.

4. The light source device according to claim 2, wherein the first polarization direction is an S-polarized direction,
wherein the second polarization direction is a P-polarized direction, and
wherein the mirror reflects the light of the first wavelength band in the first polarization direction, transmits the light of the first wavelength band in the second polarization direction, and transmits or reflects the fluorescent light.

5. The light source device according to claim 3, wherein the first polarization direction is an S-polarized direction,
wherein the second polarization direction is a P-polarized direction, and
wherein the mirror reflects the light of the first wavelength band in the first polarization direction, transmits the light of the first wavelength band in the second polarization direction, and transmits or reflects the fluorescent light.

6. The light source device according to claim 1, wherein a diffusion layer is disposed between the reflecting surface and the polarization conversion layer.

7. The light source device according to claim 2, wherein a diffusion layer is disposed between the reflecting surface and the polarization conversion layer.

8. The light source device according to claim 3, wherein a diffusion layer is disposed between the reflecting surface and the polarization conversion layer.

9. The light source device according to claim 4, wherein a diffusion layer is disposed between the reflecting surface and the polarization conversion layer.

10. The light source device according to claim 1, wherein the fluorescent area includes a first fluorescent area which is excited by the light of the first wavelength band and which emits light of a second wavelength band and a second fluorescent area which is excited by the light of the first wavelength band and which emits light of a third wavelength band.

11. The light source device according to claim 10, wherein the light of the first wavelength band is light of a blue wavelength band,
wherein the light of the second wavelength band is light of a green wavelength band, and
wherein the light of the third wavelength band is light of a red wavelength band.

12. A projector comprising:
the light source device according to claim 1;
a display element that is configured to be irradiated with source light from the light source device and to form image light; and
a projection side optical system that is configured to project the image light emitted from the display element onto a screen,
wherein the control unit controls the display element and the light source device.

13. The light source device according to claim 1, wherein the first polarization direction is an S-polarized direction,
wherein the second polarization direction is a P-polarized direction, and
wherein the mirror reflects the light of the first wavelength band in the first polarization direction, transmits the light of the first wavelength band in the second polarization direction, and transmits or reflects the fluorescent light.

14. The light source device according to claim 13, wherein a diffusion layer is disposed between the reflecting surface and the polarization conversion layer.

* * * * *